United States Patent

Tanimoto

Patent Number: 5,218,999
Date of Patent: Jun. 15, 1993

[54] SOLENOID VALVE
[75] Inventor: Yoshimitsu Tanimoto, Hyogo, Japan
[73] Assignee: Mitsubishi Denki K.K., Tokyo, Japan
[21] Appl. No.: 864,135
[22] Filed: Apr. 6, 1992

Related U.S. Application Data

[63] Continuation-in-part of Ser. No. 689,577, Apr. 23, 1991, abandoned.

[30] Foreign Application Priority Data

May 17, 1990 [JP] Japan .................. 2-127213

[51] Int. Cl.$^5$ .................. F15B 13/044; F16K 31/06
[52] U.S. Cl. .................. 137/625.65; 251/129.15; 251/129.18
[58] Field of Search .............. 137/625.27, 625.65; 251/129.15, 129.18

[56] References Cited

U.S. PATENT DOCUMENTS 3,732,893 5/1973 Ziesche et al. .......... 251/129.15 X
4,915,134 4/1990 Toliusis et al. .......... 137/625.27 X

FOREIGN PATENT DOCUMENTS

2262925 6/1974 Fed. Rep. of Germany .......... 251/129.18
64-15882 1/1989 Japan .

Primary Examiner—Gerald A. Michalsky
Attorney, Agent, or Firm—Sughrue, Mion, Zinn, Macpeak & Seas

[57] ABSTRACT

A solenoid valve comprises an elastic member interposed between a casing and a core so as to adjust the position of the core with respect to said casing, and a lid member fixedly attached to the casing so as to fix the adjusted position of the core through the bobbin mounted around the core, thereby adjusting a gap defined between the core and a plunger. Accordingly, it is possible to easily and accurately set or control the gap and to provide the solenoid valve with a constant performance.

9 Claims, 7 Drawing Sheets

SOLENOID VALVE

This is a continuation-in-part of application Ser. No. 07/689,577, filed Apr. 23, 1991, now abandoned.

BACKGROUND OF THE INVENTION

The present invention relates to a solenoid valve provided in a hydraulic circuit of an automotive vehicles or the like to control the hydraulic pressure thereof.

As disclosed in a Japanese Unexamined Utility Model Publication No. Sho. 64-15882, it is well-known to use a solenoid valve in which a spool valve is movably inserted into a sleeve so as to be operated by the excitation of an electromagnetic coil for the purpose of switching hydraulic pipe lines.

Figure 8:
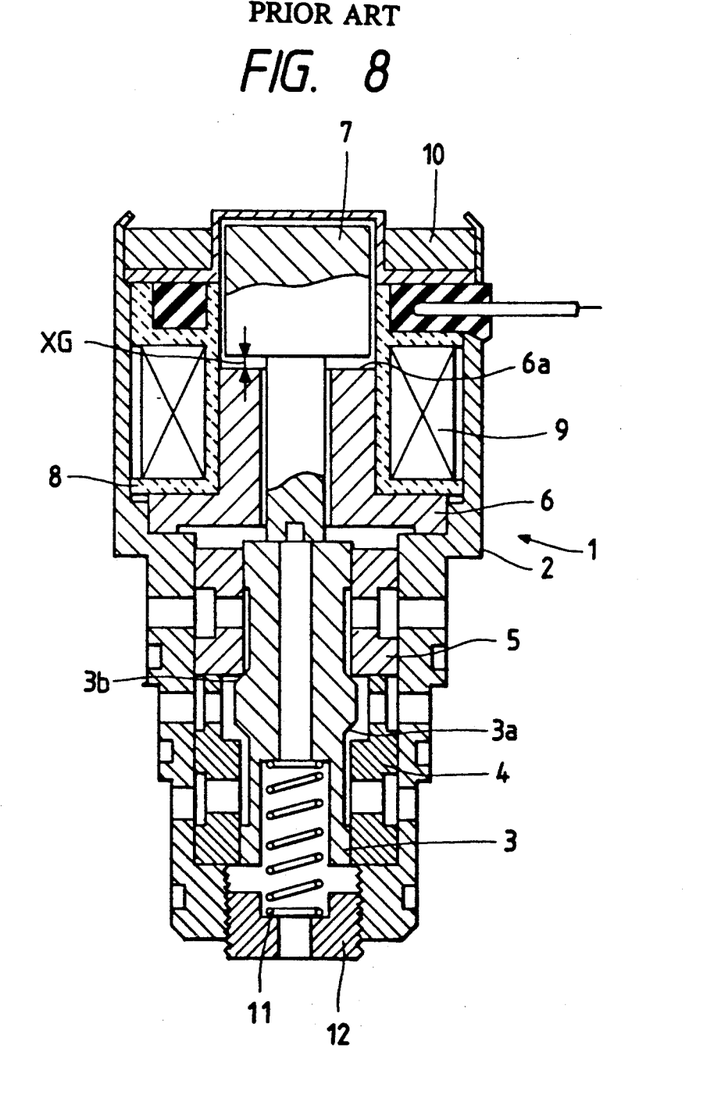
FIG. 8 is a cross-sectional view showing a conventional solenoid valve.

FIG. 8 shows an example of such conventional solenoid valve. The solenoid valve 1 comprises a spool valve 3 movably inserted into a sleeve within a casing 2. Tapered first and second valve seat portions 3a and 3b are formed on an outer surface of the valve 3. On the other hand, first and second valve seat 4 and 5 are formed on an inner circumferential surface of the sleeve so that the first and second valve seat 4 and 5 can be brought into contact with the first and second valve seat portions 3a and 3b, respectively.

A core 6 is fixed to a predetermined portion above the valve 3 within the casing 2, and is provided on the upper surface thereof with a attraction surface 6a. A plunger 7 is provided in a central portion of the casing 2, formed with a surface confronted with the attraction surface 6a, and moved in a central portion of the core 6 so as to depress the valve 3. A bobbin 8 made of insulative material is fixed to the circumference of the core 7. A coil is mounted and wound around the bobbin 8.

A lid member 10 is fixed to an inner surface of the casing 2 near the upper end portion of the casing 2. The valve 3 is biased at its lower end by a spring 11 in a direction toward the plunger 7. The spring 11 is supported at its lower end to a bolt 12 threadingly engaged with the casing 2 so that the biasing force of the spring 11 can be adjusted by the rotation of the bolt 12.

In the solenoid valve thus constructed, if the coil 9 is not in an excitation state, a gap XG is formed between the attraction surface 6a of the core 6 and the surface of the plunger 7 by the biasing force of the spring 11. In this state, the first valve seat portion 3a of the valve 3 is away from the first valve seat portion 4, whereas the second valve seat portion 3b contacts the second valve sheet 5.

If the coil 9 is energized from this case, that is, if the coil 9 becomes into the excitation state, the surface of the plunger 7 is sucked to the attraction surface 6a of the core 6 due to the magnetic force. As a result, the valve 3 is depressed against the biasing force of the spring 11 so that the first valve seat portion 3a contacts the first valve seat 4 whereas the second valve seat portion 3b is away from the second valve seat 5, thereby effecting the switching operation of the hydraulic pipe lines.

For the above-mentioned solenoid valve 1, it is an important factor that the depressing force of the plunger 7, which is acting on the valve 3, is appropriately controlled or set. In order to control or set the depressing force, it is necessary to accurately control or set the gap XG between the plunger 7 and the attraction surface 6a of the core 6. However, due to an inaccuracy of the each member of the above-mentioned solenoid valve, the gap XG is likely to be smaller or larger than a desired distance, so that it is difficult to provide a solenoid valve with the gap XG formed at a constant distance. As a result, the entire performance of the solenoid valve is deteriorated. That is, it is difficult to provide the solenoid valve with a constant gap distance and desired performance cannot be obtained.

SUMMARY OF THE INVENTION

The present invention was made in order to solve the above-mentioned problem.

Accordingly, it is an object of the present invention to provide a solenoid valve in which a gap between a plunger and a attraction surface of a core can be set with a high accuracy, so as to produce a desired, constant performance in the solenoid valve.

In order to attain the above-noted and other objects, the present invention provides a solenoid valve having, a casing, a valve reciprocated between valve seats provided within the casing, a plunger depressing an end of the valve, a core provided with a attraction surface opposing to the plunger for attracting the core, and a bobbin provided on an outer surface of the core with a coil mounted therearound. In the present invention, the core and the bobbin are slidingly movable with respect to the casing, an elastic member biases the core and the bobbin toward an end of the casing, and a fixed lid member is utilized for adjusting a gap between the plunger and the attraction surface of the core against a biasing force of the elastic member.

The present invention also provides a solenoid valve provided in a hydraulic circuit for switching hydraulic pipe lines, having a, casing with first and second valve seats, a valve movable within the casing at an amount regulated by the first and second valve seats, biasing means for biasing the valve toward the first valve seat, a plunger movable for depressing the valve toward the second valve seat against a biasing force of the biasing means, and means for electromagnetically displacing the plunger so as to depress the valve toward the second seat. The displacing means has a core for regulating the displacement of the plunger, and means for adjusting an amount of the displacement of the plunger.

DETAILED DESCRIPTION OF THE PREFERRED EMBODIMENTS

Preferred embodiments of the present invention will now be described with reference to the accompanying drawings.

FIGS. 1, 2, 3, 4 and 5 show a solenoid valve 21 according to a first embodiment of the present invention. The portions of the solenoid valve, which are equivalent to those of the conventional solenoid valve shown in FIG. 8, are denoted by the same reference symbols as the latter and not described in detail hereinafter. Therefore, only the other portions of the solenoid valve which is the embodiment ar described in detail hereinafter.

Figure 1:
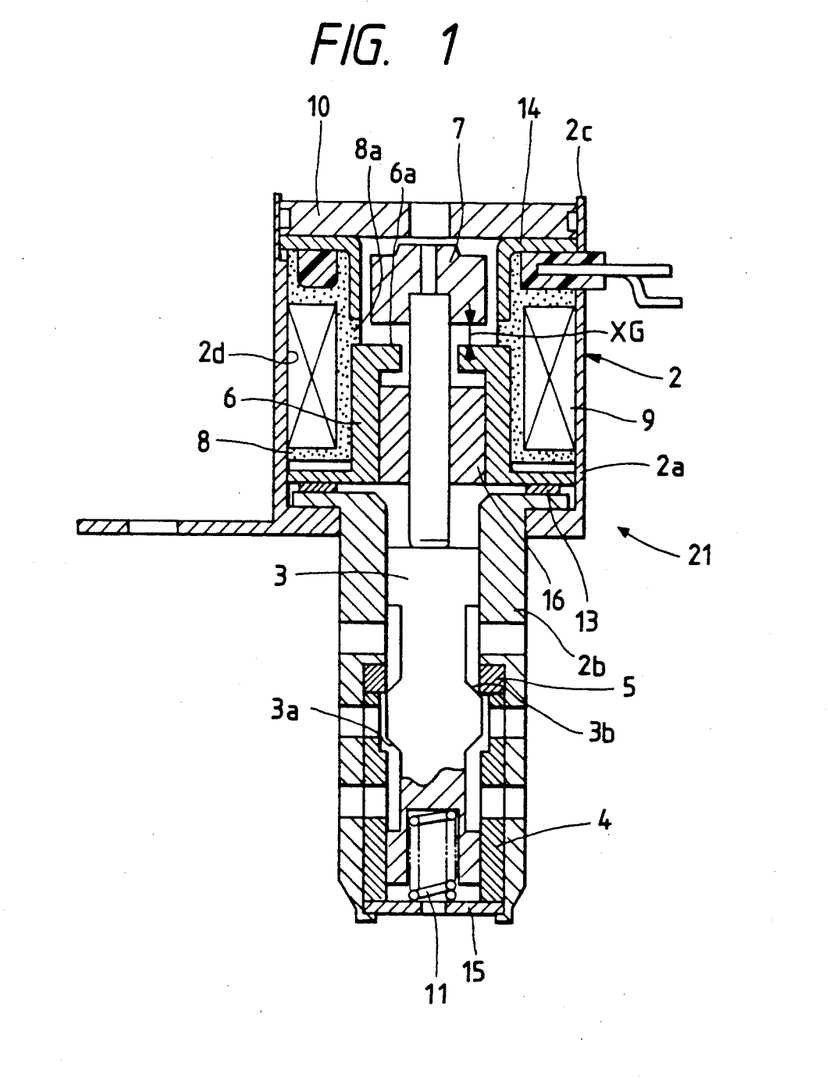
FIG. 1 is a cross-sectional view showing a solenoid valve according to an embodiment of the present invention.

In the solenoid valve, a casing 2 is divided into two separate members, i.e. a first casing 2a and a second casing 2b and formed in such a manner that the second casing 2b is inserted into the first casing 2a.

A core 6 and a bobbin 8 are slidingly provided on an inner surface 2d of the first casing 2a. An elastic member 13 such as a wave washer is interposed between the core 6 and the second casing 2b so that the core 6 is always biased by a biasing force of the elastic member toward an end surface 2c of the first casing 2a. A spacer portion or projection 8a is formed on an inner surface of the bobbin 8 so that the portion 8a is located on the attraction surface 6a of the core 6. Therefore, when the core 6 is moved by the biasing force of the elastic member 13 toward the end surface 2c of the first casing 2a, the bobbin 8 is moved toward the end surface 2c together with the core 6 since the attraction surface 6a of the core 6 engages with the spacer portion 8a of the bobbin 8. A holder 14 is integrally provided on the bobbin 8 so that the spacer portion 8a is positioned between the holder 14 and the attraction surface 6a.

A lid member 10 made of nonmagnetic material is provided on an inner surface of the first casing 2a near an upper end portion thereof. On the other hand, a plate 15 is provided on an inner surface of the second casing 2b near an lower end thereof. In addition, a guide 16 is injected or press-inserted into the core 6 so as to guide the plunger 7 along its cylindrical surface.

The solenoid valve 21 is assembled by the following steps.

First, the first casing 2a is fixed to a tool 17 formed with a hole, and components of the solenoid valve 21 are inserted into the first casing 2a in order. When all components are inserted into the first casing 2a, due to the biasing force of the elastic member 13 provided between the core 6 and the second casing 2b, the core 6, the bobbin 8, the plunger 7, the holder 14 and the lid member 10 are slightly floated, with respect to the first casing 2a, toward the end surface 2c.

Figure 2:
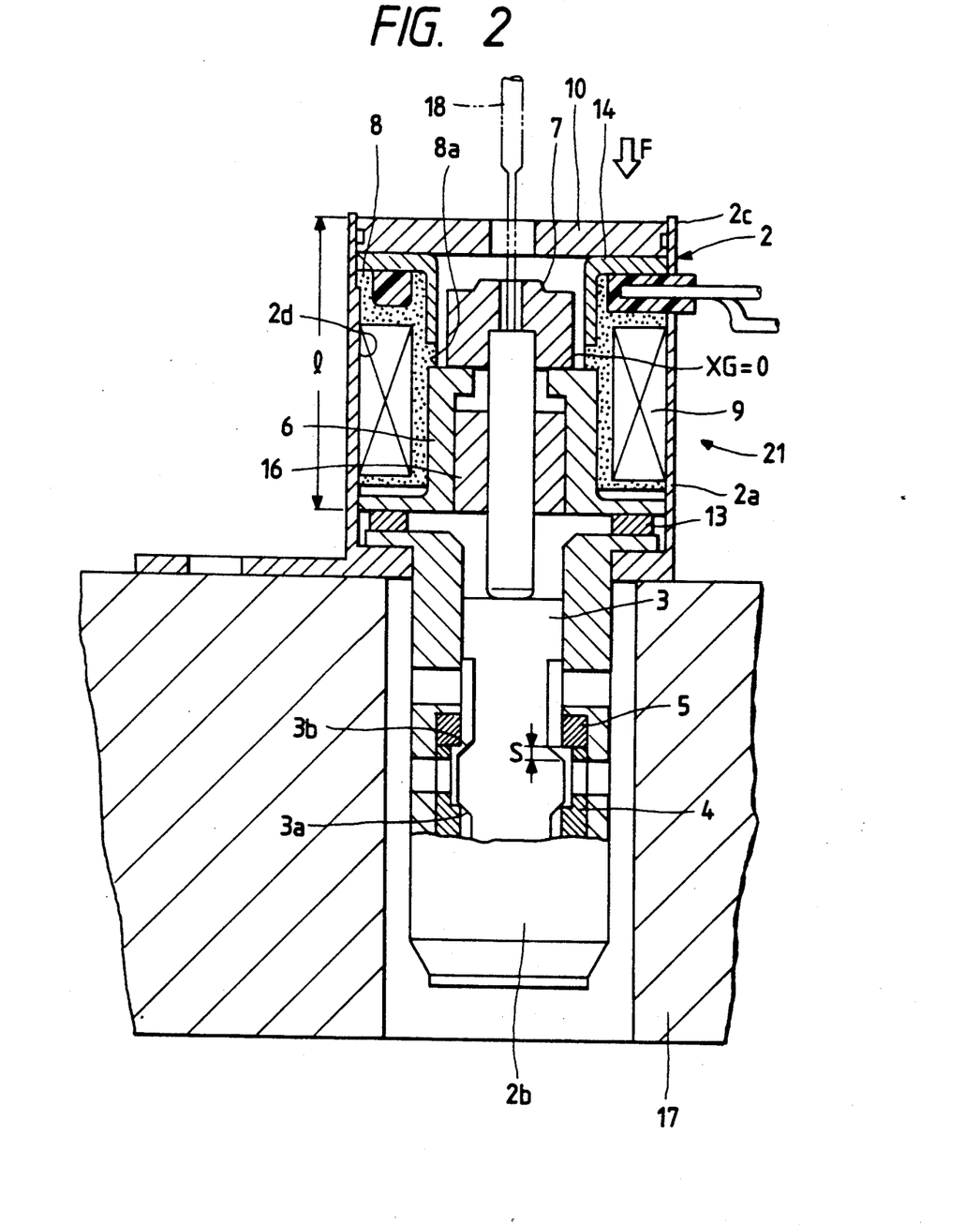
FIGS. 2 and 3 are cross-sectional views, each showing an assembling manner of the solenoid valve.

In the floated state, a pin 18 is inserted into a hole formed on the lid member 10 so as to depress the plunger 7 until the first valve seat portion 3a contacts the first valve seat 4. As a result, the gap XG between the plunger 7 and the attraction surface 6a of the core 6 becomes equal to zero as shown in FIG. 2.

After that, if a weak load F, which is smaller than the biasing force of the elastic member 13, is applied to the lid member 10, then the core 6, the bobbin 8, the holder 14 and the lid member 10 are kept in contact with each other and act as one rigid body, so that a distance between an upper surface of the lid member 10 and a lower surface of the core 6 becomes a constant value l (a rigid body distance).

Figure 3:
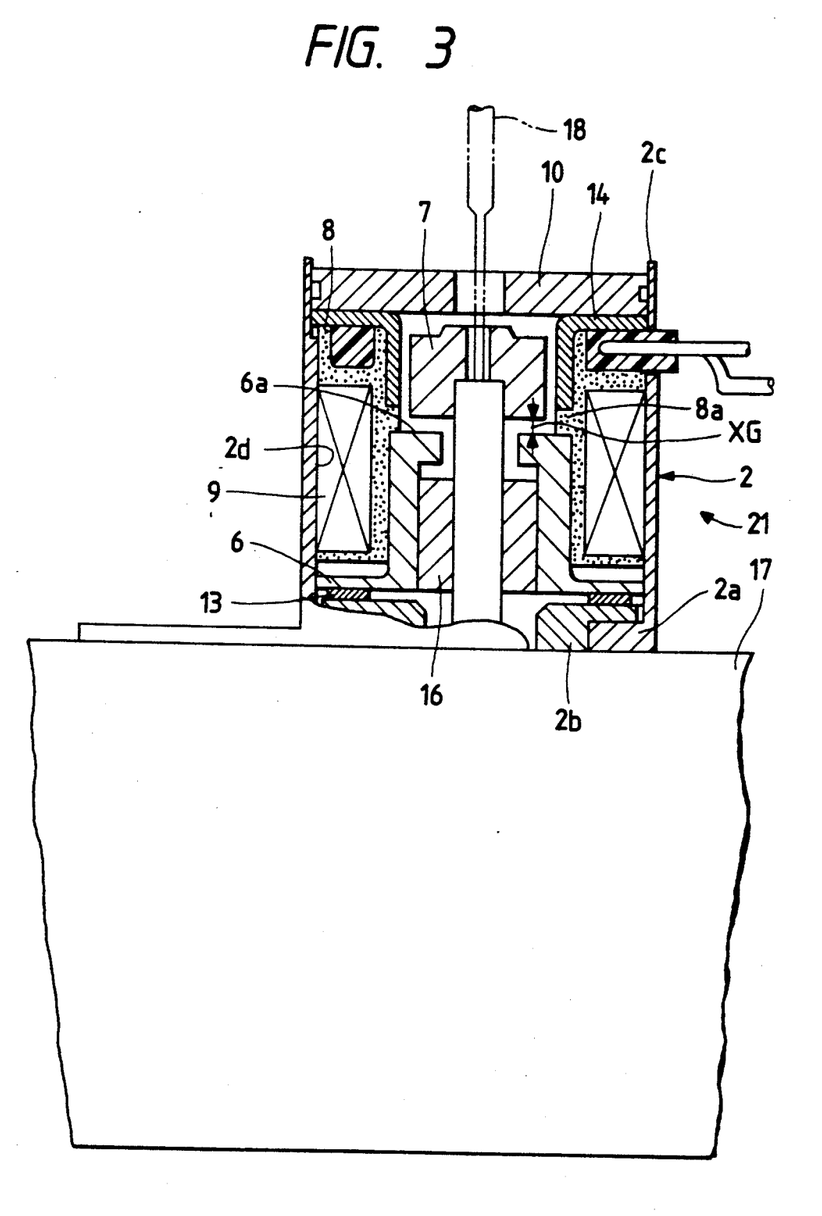

From this state, the lid member 10 is further depressed to move at a predetermined amount of XG which is determined in advance with taking the desired movement of the valve into consideration. As a result, since the rigid body distance is kept at a constant value, the elastic member 13 contracts so that the attraction surface 6a is moved while keeping the plunger at its position. Accordingly, the gap XG is appropriately set or controlled at a predetermined value as shown in FIG. 3.

Figure 4:
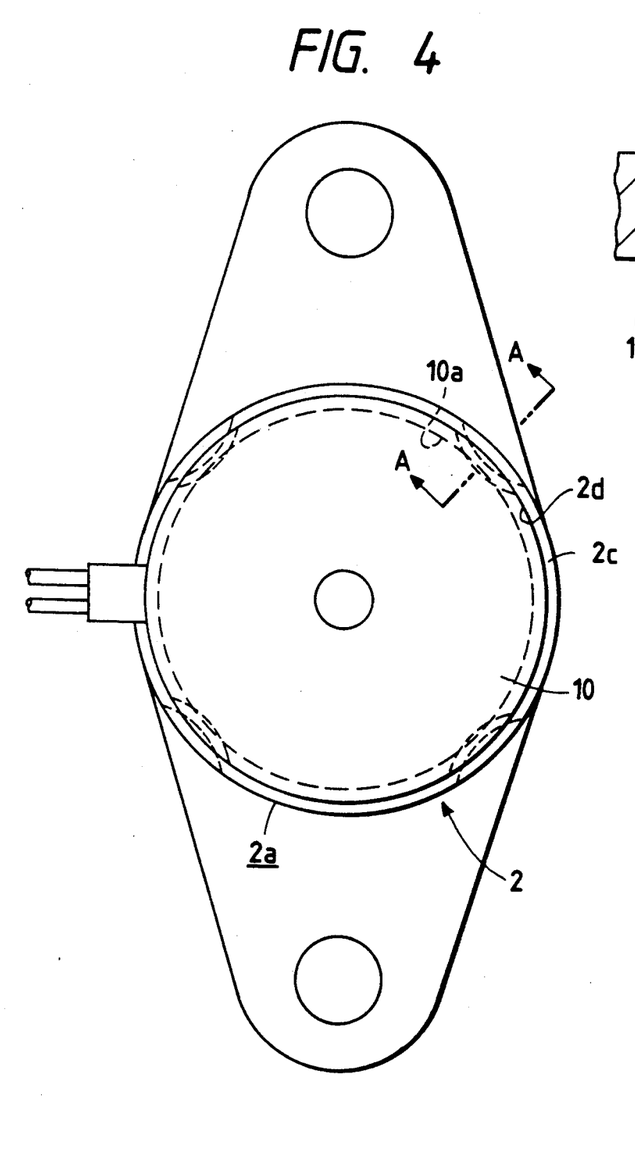
FIG. 4 is a plan view of the solenoid valve shown in FIG. 1.
Figure 5:
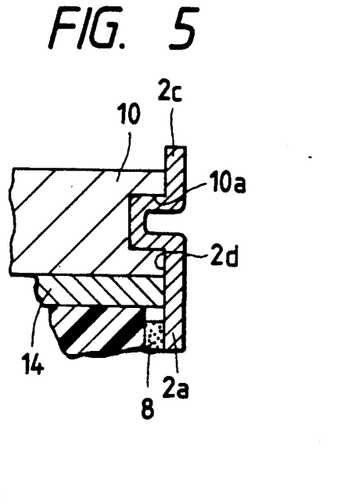
FIG. 5 is a cross-sectional view taking along A-A line in FIG. 5.

After that, as shown in FIGS. 4 and 5, the lid member 10 is fixed to the first casing 2a by plastically deforming a portion of the first casing 2a with a punch (not shown) so that the part is bent into the groove 10a formed on the outer periphery of the lid member 10.

By the above-assembling steps be performed, the gap XG between the plunger 7 and the attraction surface 6a of the core 6 can be accurately set or controlled at its desired value.

Figures 6, 7:
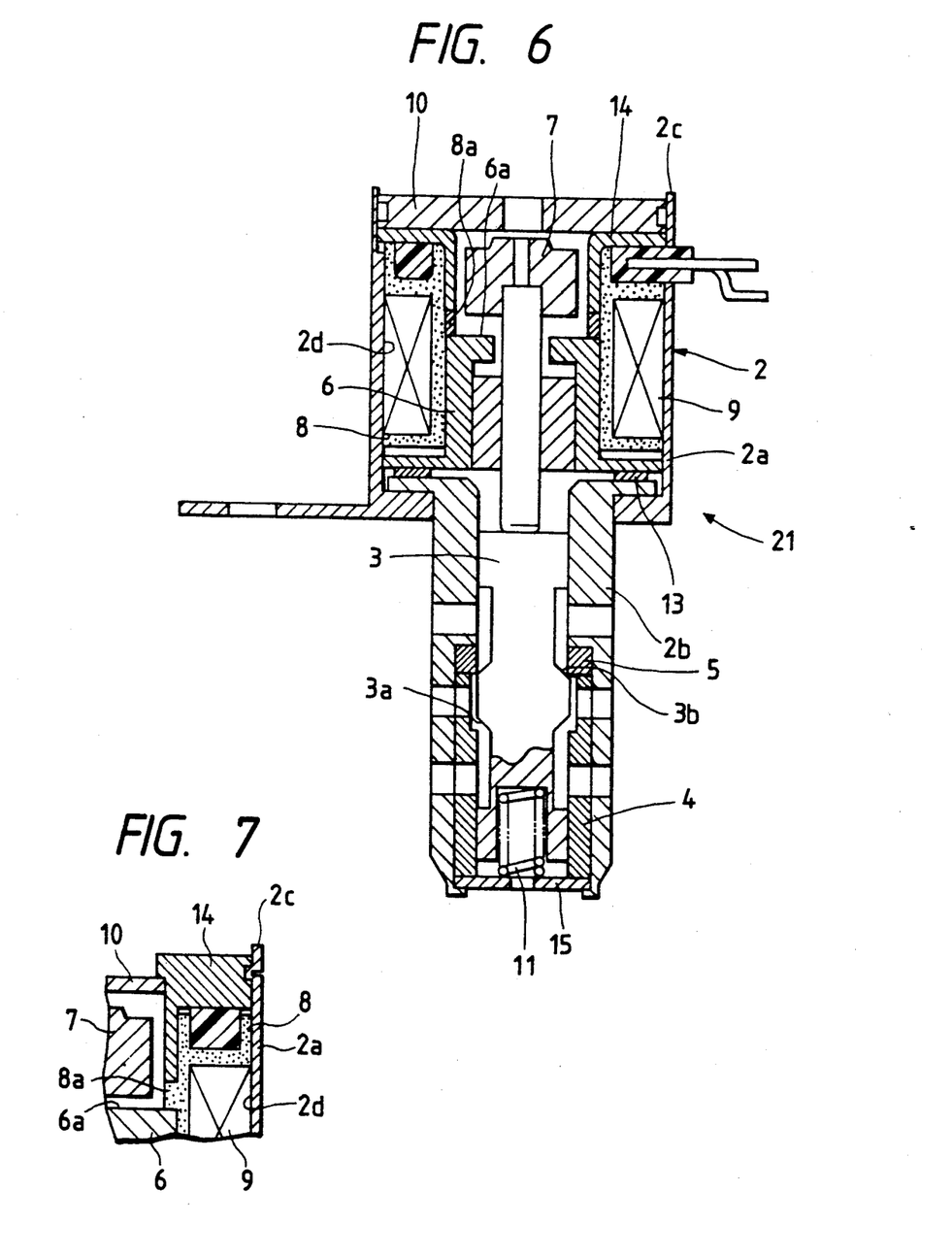
FIG. 6 is a cross-sectional view showing a modified one of the solenoid valve shown in FIG. 1.
FIG. 7 is a cross sectional view showing a major part of a further modified one of the solenoid valve shown in FIG. 1.

In addition, the spacer portion or projection 8a is formed as a part of the bobbin 8, but the invention should not restricted thereto or thereby. For example, as shown in FIG. 6, the spacer portion may be formed as a separate member 8a made of non-excitation member.

Also, in the embodiment described above, the lid member 10 and the first casing 2a are directly fixed to each other, but the invention should not restricted thereto or thereby. For example, as shown in FIG. 7, the holder 14 may be fixed to the first casing 2a so that an inner side of the holder 14, which faces the plunger 10 is used as the lid member 10 made of the non-excitation material.

Further, in the embodiment described above, a casing 2 is divided into two separate members, but the present invention should not be restricted thereto or thereby. The casing may be formed as a single integral member.

Figure 9:
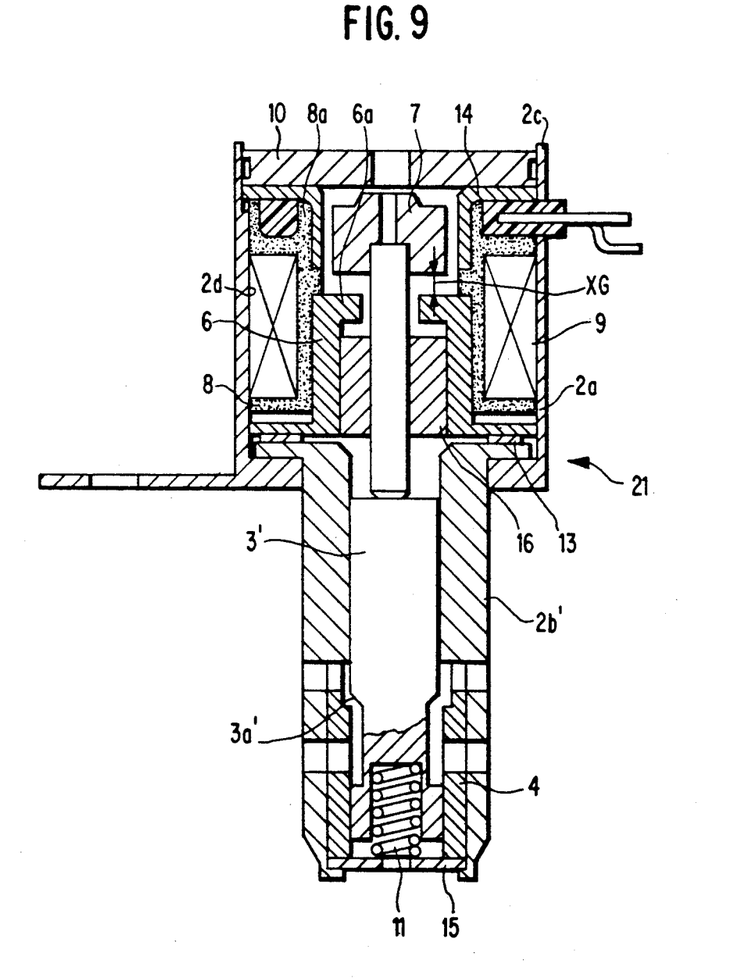
FIG. 9 illustrates a solenoid valve of the second preferred embodiment.

A second preferred embodiment is illustrated in FIG. 9. In this embodiment, valve 3' has only one valve seat portion 3a' formed thereon. Also, only one hydraulic input line and one hydraulic output line are formed in second casing 2b'. This embodiment operates in a manner similar to the first embodiment except that valve 3 and plunger 7 are free to move in an upwards direction (in FIG. 9) until plunger 7 interacts with lid member 10. Other portions of this embodiment are similar to those of the first embodiment and are indicated with like reference numerals.

As described above, in the present invention, it is possible to easily and accurately set and control the gap between the plunger and the attraction surface of the core so as to provide a solenoid valve with consistant performance.

What is claimed is:

1. A solenoid valve comprising:
   a casing:
   a valve adapted to be in contact with a valve seat provided within said casing, said valve being reciprocated within said casing:
   a plunger depressing an end of said valve;
   a core with an attraction surface opposing said plunger for attracting said core;
   a bobbin provided on an outer surface of said core and having a coal mounted therearound, said core and said bobbin being slidingly movable with respect to said casing;
   an elastic member biasing said core and said bobbin toward and end of said casing; and a lid member positioned so as to adjust a gap between said plunger and said attraction surface of said core against a biasing force of said elastic member, said lid member being fixedly attached to said casing, said bobbin being supported between said lid member and said elastic member.

2. The solenoid valve according to claim 1, wherein said casing is divided into first and second casings.

3. The solenoid valve according to claim 1, wherein said lid member is formed with an opening at its central portion.

4. The solenoid valve according to claim 1, wherein said elastic member includes a wave washer interposed between said core and casing.

5. A solenoid valve as claimed in claim 1, wherein movement of said plunger away from said valve seat is limited by interaction between said plunger and said lid member.

6. A solenoid valve provided in a hydraulic circuit for switching hydraulic pipe lines, comprising:
   casing having first and second valve seats;
   a valve movable within said casing in an amount regulated by said first and second valve seats;
   biasing means for biasing said valve toward said first valve seat;
   a plunger movable for depressing said valve toward said second valve seat against a biasing force of said biasing means;
   means for electromagnetically displacing said plunger so as to depress said valve toward said second seat, said displacing means having a core for regulating the displacement of said plunger, said core having a bobbin provided on an outer surface thereof, said bobbin having an electromagnetic coil mounted thereon, said core and said bobbin being slidingly movable with respect to said casing;
   an elastic member biasing said core and said bobbin toward said plunger; and
   means for adjusting an amount of the displacement of said plunger comprising a lid member fixed to said casing for closing one end of said casing and for positioning said core and said bobbin in a desired position against a biasing force of said elastic member.

7. The solenoid valve according to claim 6, wherein said core and said casing are provided with a flange and a step portion, respectively, and said elastic member is interposed between said flange and said step portion for adjusting a position of said core with respect to said casing.

8. The solenoid valve according to claim 6, wherein said core is formed with an electromagnetically attracting surface, and said plunger is formed with a surface opposing to said electromagnetically attracting surface for regulating the amount of the displacement of said plunger by contacting said attracting surface therewith.

9. The solenoid valve according to claim 8, wherein said adjusting means includes means for adjusting a position of said core with respect to said casing, thereby varying the amount of the displacement of said plunger.

* * * * *